United States Patent
Diab et al.

(10) Patent No.: US 9,455,912 B2
(45) Date of Patent: Sep. 27, 2016

(54) METHOD AND SYSTEM FOR A DISTINCT PHYSICAL PATTERN ON AN ACTIVE CHANNEL TO INDICATE A DATA RATE TRANSITION FOR ENERGY EFFICIENT ETHERNET

(75) Inventors: Wael William Diab, San Francisco, CA (US); Howard Frazier, Pleasanton, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1131 days.

(21) Appl. No.: 12/235,506

(22) Filed: Sep. 22, 2008

(65) Prior Publication Data

US 2009/0154492 A1 Jun. 18, 2009

Related U.S. Application Data (60) Provisional application No. 61/014,357, filed on Dec. 17, 2007.

(51) Int. Cl.
*H04J 3/06* (2006.01)
*H04L 12/801* (2013.01)

(52) U.S. Cl.
CPC ................ *H04L 47/10* (2013.01)

(58) Field of Classification Search
CPC .................................................. H04L 47/10
USPC ....... 370/431, 450, 451, 454, 458, 459, 461, 370/229, 231, 253, 232, 235, 252
See application file for complete search history.

(56) References Cited

U.S. PATENT DOCUMENTS

| 4,849,969 A * | 7/1989 | Annamalai ................. 370/517 |
| 6,741,566 B1 * | 5/2004 | Furlong et al. ............... 370/236 |
| 6,795,450 B1 | 9/2004 | Mills et al. |
| 6,856,597 B1 | 2/2005 | Scott |

(Continued)

FOREIGN PATENT DOCUMENTS

| EP | 1484876 A2 | 8/2004 |
| EP | 1 473 870 | 11/2004 |

(Continued)

OTHER PUBLICATIONS

European Search Report corresponding to European Patent Application No. 08021185.7-2416, dated Mar. 30, 2009.

(Continued)

*Primary Examiner* — Brenda H Pham
(74) *Attorney, Agent, or Firm* — Foley & Lardner LLP (57) ABSTRACT

Aspects of a method and system for a distinct physical pattern on an active channel to indicate a data rate transition for energy efficient Ethernet. In this regard, one or more distinct physical patterns may be transmitted on one or more active channels of a network link during an inter-packet gap to control a data rate on the link. The unique physical pattern may be transmitted instead of or in addition to one or more IDLE symbols. The distinct physical pattern may communicate a data rate to be utilized on the link and/or indicate when a data rate transition should occur on the link. The distinct pattern may be transmitted and/or the data rate transition may occur during a specified inter-packet gap or during a specified packet boundary. The distinct physical pattern may comprise one or more control characters and/or an ordered set of voltage levels, symbols, and/or characters.

18 Claims, 7 Drawing Sheets

(56) References Cited

U.S. PATENT DOCUMENTS

| | | | |
|---|---|---|---|
| 7,027,547 B1* | 4/2006 | Hwang | 375/372 |
| 7,492,710 B2* | 2/2009 | Wadekar et al. | 370/230 |
| 7,573,940 B2* | 8/2009 | Connor et al. | 375/257 |
| 7,593,327 B2* | 9/2009 | Bordogna et al. | 370/230 |
| 8,571,063 B2* | 10/2013 | Diab et al. | 370/468 |
| 2004/0156317 A1* | 8/2004 | Lund | 370/235 |
| 2005/0030898 A1* | 2/2005 | Furlong et al. | 370/236 |
| 2006/0034295 A1 | 2/2006 | Cherukuri et al. | |
| 2006/0221831 A1* | 10/2006 | Wadekar et al. | 370/235 |
| 2007/0280239 A1 | 12/2007 | Lund | |
| 2008/0225841 A1 | 9/2008 | Conway et al. | |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Bennett et al., "Energy Efficient Ethernet." Retrieved from the Internet on Dec. 15, 2008: http://www.iee802.org/802_tutorials/july07/IEEE-tutorial-energy-efficient-ethernet.pdf.

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

Lee, et al., "A New-Size-Based Burst Assembly Scheme for OBS Switches," ICCSA, 2006, LNCS 2981, pp. 1140-1148, Springer-Verlag Berlin Heidelberg.

TW Office Action, Nov. 27, 2013.

TW Office Action, Mar. 26, 2014.

* cited by examiner

METHOD AND SYSTEM FOR A DISTINCT PHYSICAL PATTERN ON AN ACTIVE CHANNEL TO INDICATE A DATA RATE TRANSITION FOR ENERGY EFFICIENT ETHERNET

CROSS-REFERENCE TO RELATED APPLICATIONS/INCORPORATION BY REFERENCE

This patent application makes reference to, claims priority to and claims benefit from U.S. Provisional Patent Application Ser. No. 61/014,357 filed on Dec. 17, 2007.

This patent application also makes reference to U.S. Provisional Patent Application Ser. No. 61/094,639 filed on Sep. 5, 2008.

Each of the above stated applications is hereby incorporated herein by reference in its entirety.

FIELD OF THE INVENTION

Certain embodiments of the invention relate to networking. More specifically, certain embodiments of the invention relate to a method and system for a distinct physical pattern on an active channel to indicate a data rate transition for energy efficient Ethernet.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular. These recent developments have led to increased demand on datacenters, aggregation, high performance computing (HPC) and core networking.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a distinct physical pattern on an active channel to indicate a data rate transition for energy efficient Ethernet, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a distinct physical pattern on an active channel to indicate a data rate transition for energy efficient Ethernet. In this regard, one or more distinct physical patterns may be transmitted on one or more active channels of a network link during an inter-packet gap (IPG) to control a data rate on the network link. The unique physical pattern may be transmitted instead of or in addition to one or more IDLE symbols. The distinct physical pattern may communicate a data rate to be utilized on the network link, indicate when a data rate transition is to occur on the network link, indicate that a change in data rate is desired, indicate which data rate management techniques to utilize to realize a data rate, or control which of the one or more channels of the network link are to be utilized for communicating data. The data rate on the link may be controlled based on power consumption on the link and//or power consumptions of one or more nodes communicatively coupled to said network link.

Figure 1:
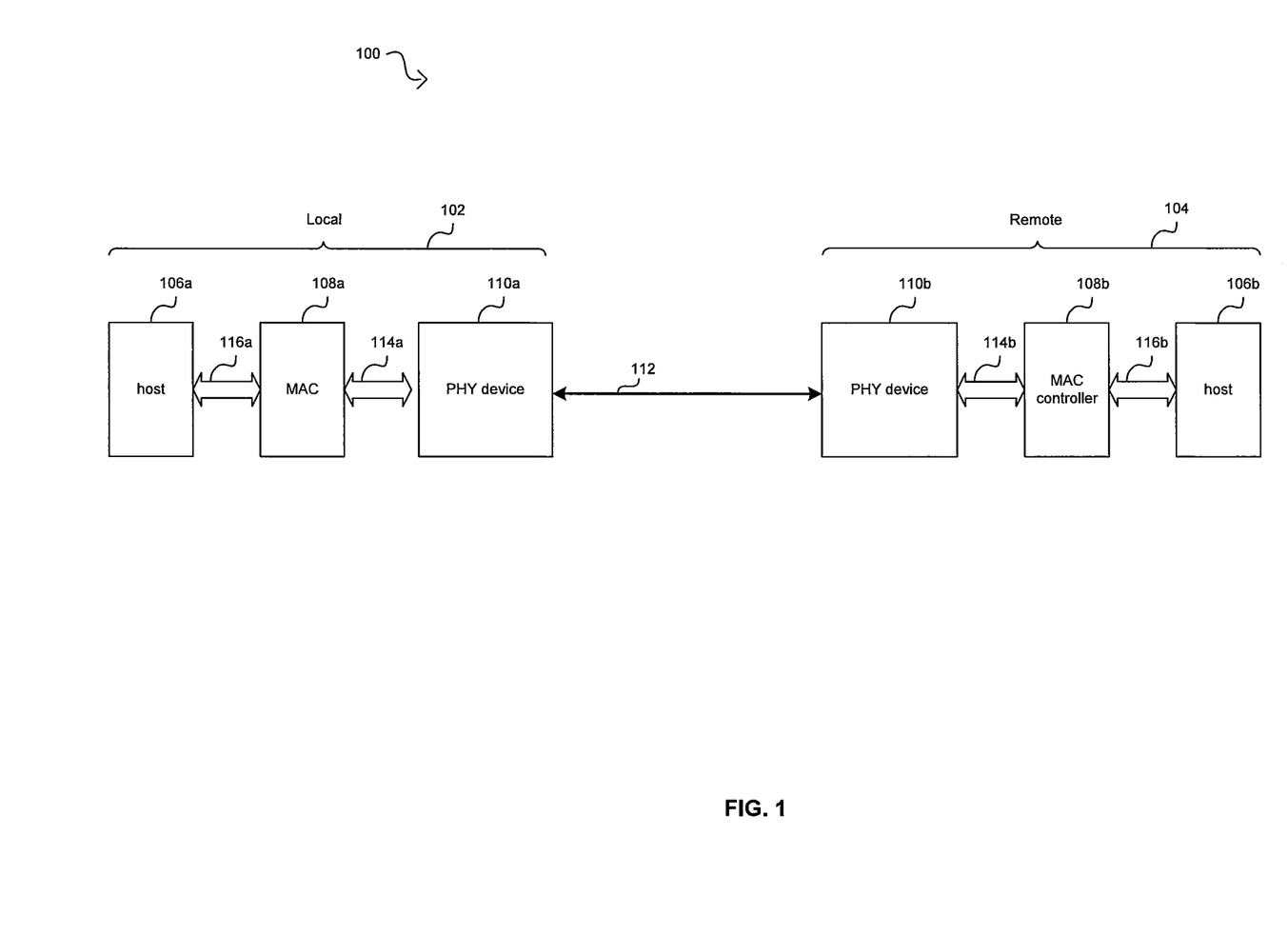
FIG. 1 is a block diagram illustrating an Ethernet connection between two nodes, in accordance with an embodiment of the invention.

FIG. 1 is a block diagram illustrating an Ethernet connection between two nodes, in accordance with an embodiment of the invention. Referring to FIG. 1, there is shown a system 100 that comprises a node 102 and a node 104. The node 102 and the node 104 may communicate via an Ethernet link 112.

The node 102 and the node 104 may communicate via the Ethernet link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The node 102 and the node 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the nodes 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the nodes 102 and/or 104 may comprise a backplane PHY capable of operating at one or more standard rates such as 10 Gbps (10 GBASE-KX4 and/or 10GBASE-KR); and/or non-standard rates such as 2.5 Gbps and 5 Gbps.

In an exemplary embodiment of the invention, the nodes 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the nodes, the nodes 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the nodes 102 and/or 104.

The node 102 may comprise a host 106a, a medium access control (MAC) controller 108a, and a PHY device 104a. The node 104 may comprise a host 106b, a MAC controller 108b, and a PHY device 110b. Notwithstanding, the invention is not limited in this regard. In various embodiments of the invention, the node 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the nodes 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the node 102 and the node 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the node 102 and the node 104 by utilizing a link discovery signaling (LDS) operation that enables detection of active operations in the other node. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the node 102 may comprise a multimedia server and the node 104 may comprise a multimedia client. In this regard, the node 102 may transmit multimedia data, for example, to the remote partner 104 at high(er) data rates while the node 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise packets of Ethernet media independent interface (MII) data which may be delimited by start of stream and end of stream delimiters, for example. Exemplary MIIs may comprise gigabit MII (GMII), 10 Gigabit MII (XGMII), Serial Gigabit MII (SGMII), and Reduced Gigabit MII (RGMII).

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112. Moreover, control characters may be generated by a sub-layer within the physical layer, for example, the physical coding sub-layer (PCS) in a 10GBASE-T system. These control characters, also known as special symbols, may be transmitted on silent channels or during inter-packet gap (IPG, which may also be referred to as inter-frame gap) on active channels that are not actively carrying data packets or on active channels. For example, control characters may comprise IDLE symbols, or similar information may be periodically transmitted via silent channels or during or during IPG on active channels.

The MAC controller 108a may comprise suitable logic, circuitry, and/or code that may enable handling of data link layer, layer 2, operability and/or functionality in the node 102. Similarly, the MAC controller 108b may comprise suitable logic, circuitry, and/or code that may enable handling of layer 2 operability and/or functionality in the node 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels at a fixed data rate which may result in network links being underutilized for significant portions of time. In this regard, when the nodes 202 and 204 first establish a connection, they may exchange some preliminary information and/or training signals. In this regard, the nodes 102 and 104 may negotiate a data rate (e.g., 10 Gbps) and duplex mode (e.g., full-duplex) for communicating with each other. Additionally, in order to establish reliable communications, each of the nodes 102 and 104 may need to "train" or adjust various parameters and/or circuitry in a node to account for variables such as the type of cabling over which data is being communicated and the environmental conditions (e.g. temperature) surrounding the cabling. Once the nodes are "trained", they may initially transmit data at a first data rate. In this regard, conventional PHY devices may distribute traffic evenly over all available channels and between packets of actual data, during the IPG, IDLE symbols or similar information may be communicated.

Based, for example, on link utilization, past or present traffic statistics, and/or available resources (e.g., power, buffer space, processor time, etc.), it may be determined that a data rate on the link 112 may be higher than necessary or desired. Accordingly, reducing the data rate of the connection between the nodes 102 and 104 may enable the nodes 102 and 104 to communicate in a more energy efficient manner. In this regard, the data rate may be controlled via one or more data rate management techniques such as controlling a number of channels utilized to communicate data, controlling the signal constellation utilized for representing data on the link, controlling a rate at which symbols are transmitted, and controlling the length of time between packets (the IPG).

Similarly, based, for example, on link utilization, past or present traffic statistics, and/or available resources comprising for example, power, buffer space, and/or processor time, it may be determined that a data rate on the link may be lower than necessary or desired. Accordingly, in instances that the data rate may be less than a maximum data rate, then the data rate may be increased. The data rate may be increased via one or more data rate management techniques such as controlling a number of channels utilized to communicate data, controlling the signal constellation utilized for representing data on the link, controlling a rate at which symbols are transmitted, and/or controlling the length of time between packets (the IPG).

When controlling a data rate on the link 112, the nodes 102 and 104 may need a way to indicate, for example, that a different data rate may be desired and/or necessary, to indicate when the transition in data rate is to occur, indicate what the different data rate should be, and indicate how the new data rate is to be achieved. Accordingly, aspects of the invention may enable utilizing one or more distinct physical patterns transmitted in place of and/or in addition to IDLE symbols, to coordinate data rate control on an Ethernet link. In this regard, a distinct physical pattern may be transmitted during an inter-packet gap (IPG) on a channel that may be active and/or may be transmitted during, or as part of, an Ethernet packet. The distinct physical pattern(s) may comprise a distinct sequence, or ordered set, of voltages, symbols, and/or characters. With regards to when the transition is to occur, the distinct physical pattern may indicate that the transition in data rate is to occur, for example, before a specified Ethernet packet, during a specified packet boundary (e.g., on a specified or designated bit of the packet), or during a refresh period.

In various embodiments of the invention, a distinct physical pattern may be utilized for some but not all data rate transitions. For example, a distinct physical signal may be utilized to indicate a transition to higher data rates, but other techniques may be utilized to indicate a transition to a lower data rate.

In various embodiments of the invention, distinct physical patterns may also be communicated over the media independent interfaces to indicate the data rate transition on the link 112 to higher layer functions of the nodes 102 and 104. In this regard, the higher layer functions may adjust, for example, clock speeds, buffer sizes, and/or power allocation, based on the data rate on the link 112.

Figure 2:
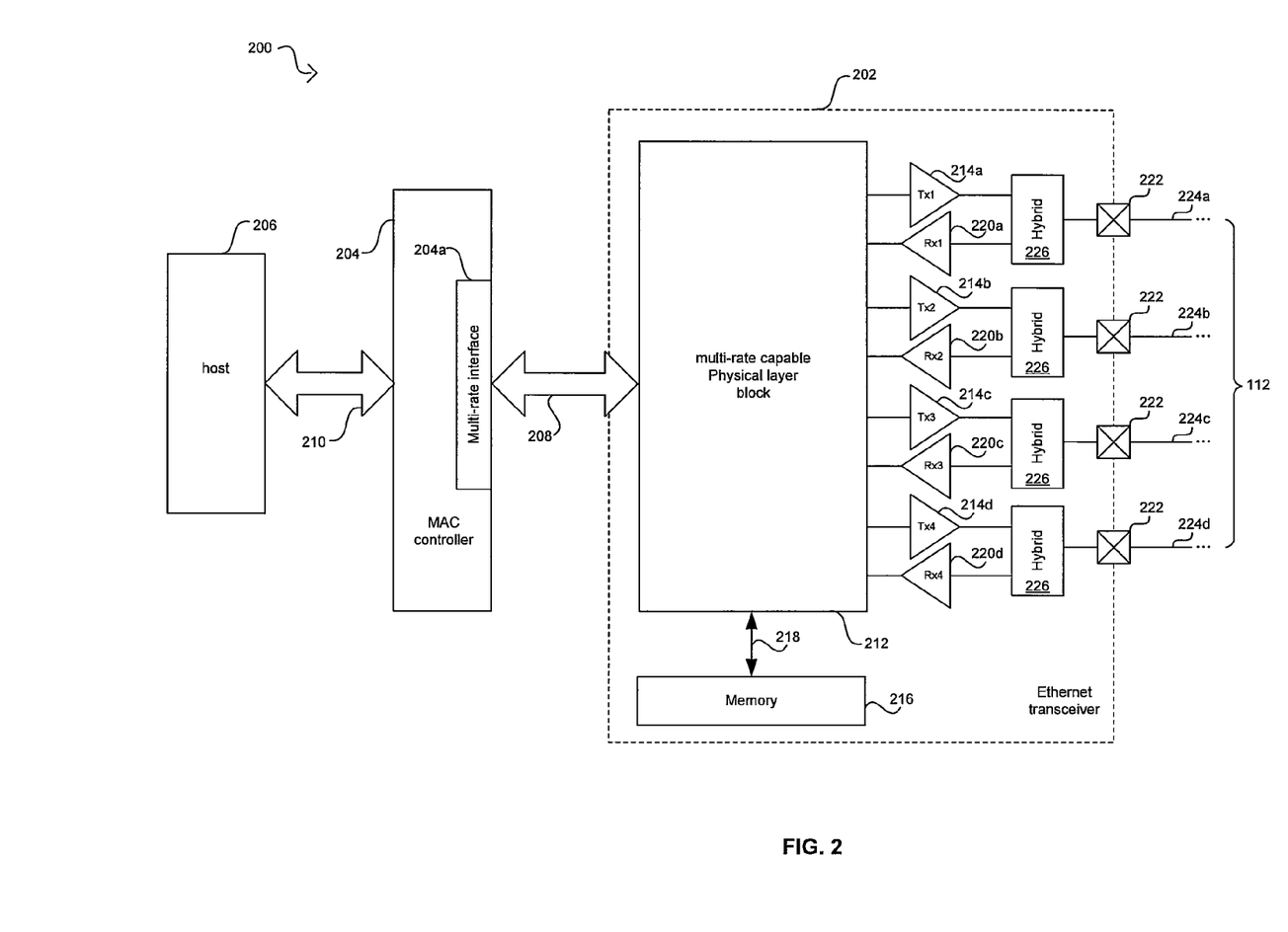
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a node 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote node. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between nodes. The multi-rate physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the node 200 to a remote node via, for example, the link 112 in FIG. 1. The receivers 220a, 220b, 220c, 220d may comprise suitable logic, circuitry, and/or code that may enable receiving data from a remote node. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the node 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the node 300 may be communicatively coupled to an input/output interface 222.

In various embodiments of the invention, the node 200 may disable, or put into a low(er) power state, one or more of the physical channels 224, when those one or more channels are not required to meet current and/or future demand of the link. In this manner, transmitters 214, receivers 220, hybrids 226, and/or portions of the multi-rate PHY block 212 associated with the unused channels may be powered down. In various embodiments of the invention, a channel in a low(er) power state a may convey little or no data any may be silent, convey IDLE symbols, and/or convey other energy. In some instances, aspects of the invention may enable placing all channels of a link into a low(er) power state. In other instances, all channels of a link may remain active and a data rate on each of the channels may be controlled.

In operation, the node 200 may communicate with a remote partner via the link 112. For example, for 100 Mbps Ethernet, the node 200 may transmit to a remote partner via the link 224a and may receive data from the remote partner via the link 224b. In this regard, in instances when there may be no data for the node 200 to transmit, the node 200 may transmit IDLE symbols to maintain synchronization with the remote node. However, in order to coordinate data rates on the link 112, aspects of the invention may enable transmitting one or more distinct physical patterns on the link. Each of the distinct physical pattern(s) may comprise a sequence, or ordered set, of voltages, symbols, and/or characters. The distinct physical pattern(s) may be in addition to and/or in place of IDLE symbols during an IPG.

Figure 3:
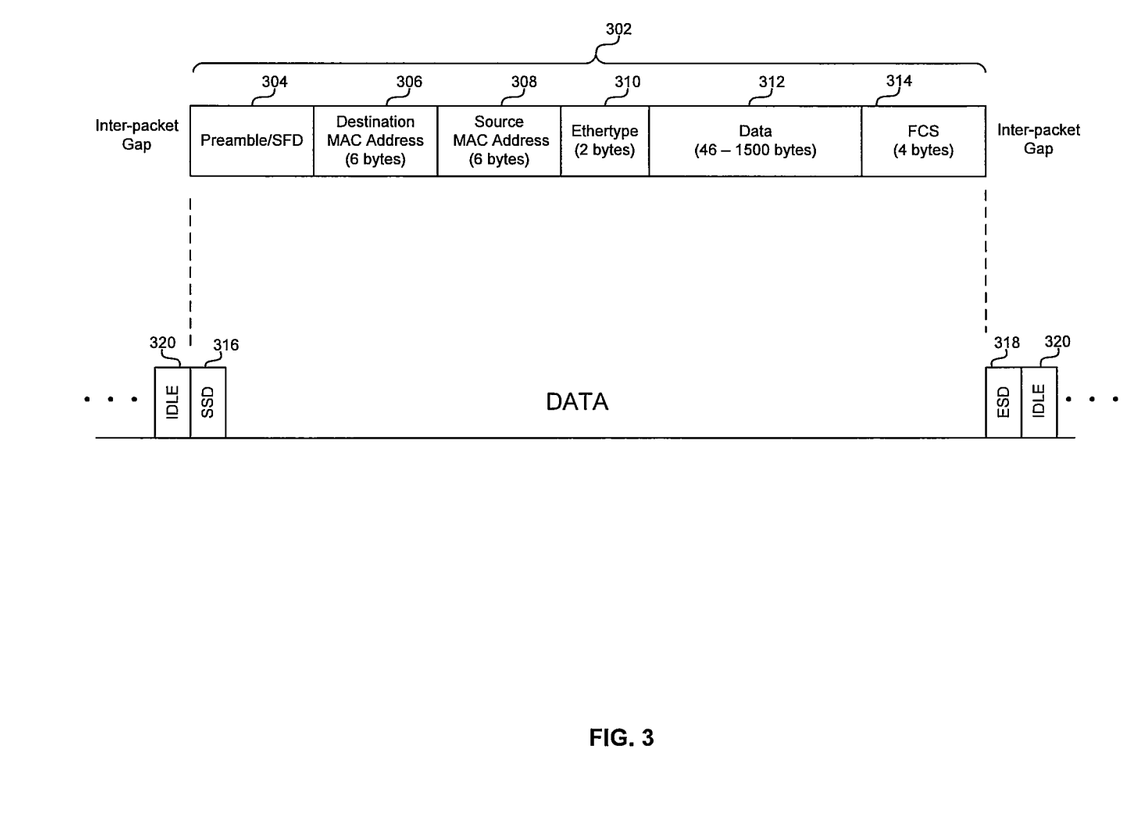
FIG. 3 is a diagram illustrating exemplary activity on an Ethernet link, in accordance with an embodiment of the invention.

FIG. 3 is a diagram illustrating exemplary activity on an Ethernet link, in accordance with an embodiment of the invention. Referring to FIG. 3, there is shown an exemplary Ethernet packet 302, preceded and followed by IDLE symbols 320.

The Ethernet packet 302 may comprise a preamble 304, destination MAC address field 306, a source MAC address field 308, an Ethertype field 310, a data field 312, and a packet check sequence (FCS) 314.

The first 62 bits of the preamble may be utilized to phase lock a receiving PHY device to a transmitting PHY device. The last 2 bits of the preamble, '11', may indicate the end of the preamble and that the next bit received will be real data. The final byte of the preamble (the last 8 bits ending in '11') is also known as a start of packet delimiter (SFD) 316. In various embodiments of the invention, the first 8 bits of the preamble may be replaced with a start of stream delimiter (SSD) 316 to indicate the end of an IPG and the beginning of a packet.

The destination MAC address field 306 may comprise information that may be utilized to identify the node that the packet is to be sent to. The source MAC address 308 field may comprise information that may be utilized to identify the node that originated the packet. The Ethertype field 310 may comprise information that may be utilized to identify the protocol (e.g. IPv4 or IPv6) being transported in the packet. The data field 312 may contain the data being transmitted. The FCS 314 may comprise information that may be utilized to provide error detection for the packet. In various instances of the invention, the packet 302 may be immediately followed by an end of sequence delimiter (ESD) 318 to indicate the end of a packet and the beginning of an IPG.

The IDLE symbols 420 may be utilized to maintain synchronization between nodes. In this regard, conventional systems may utilize IDLE symbols as defined in the 802.3 standards. However, aspects of the invention may enable altering and/or replacing or more of the IDLE symbols 320 to transmit one or more distinct physical patterns to coordinate a data rate at which packets such as the packet 302 are transmitted.

In various embodiments of the invention the distinct physical pattern may be communicated utilizing one or more discrete voltage and/or power levels communicated over the channel(s). In various embodiments of the invention, the discrete levels that are transmitted and/or the sequence in which the levels are transmitted may correspond to control information for a data rate transition. In some instances, a portion of the sequence may correspond to a preamble which may be operable to alert a receiver that data rate transition information is forthcoming. In some instances, the data rate transition information may be packetized and may comprise for example, a header, a payload, and/or a CRC. In various embodiments of the invention, the distinct pattern may be encoded utilizing, for example, LDPC encoding in order to enable error correction at the receiver.

Figure 4A:
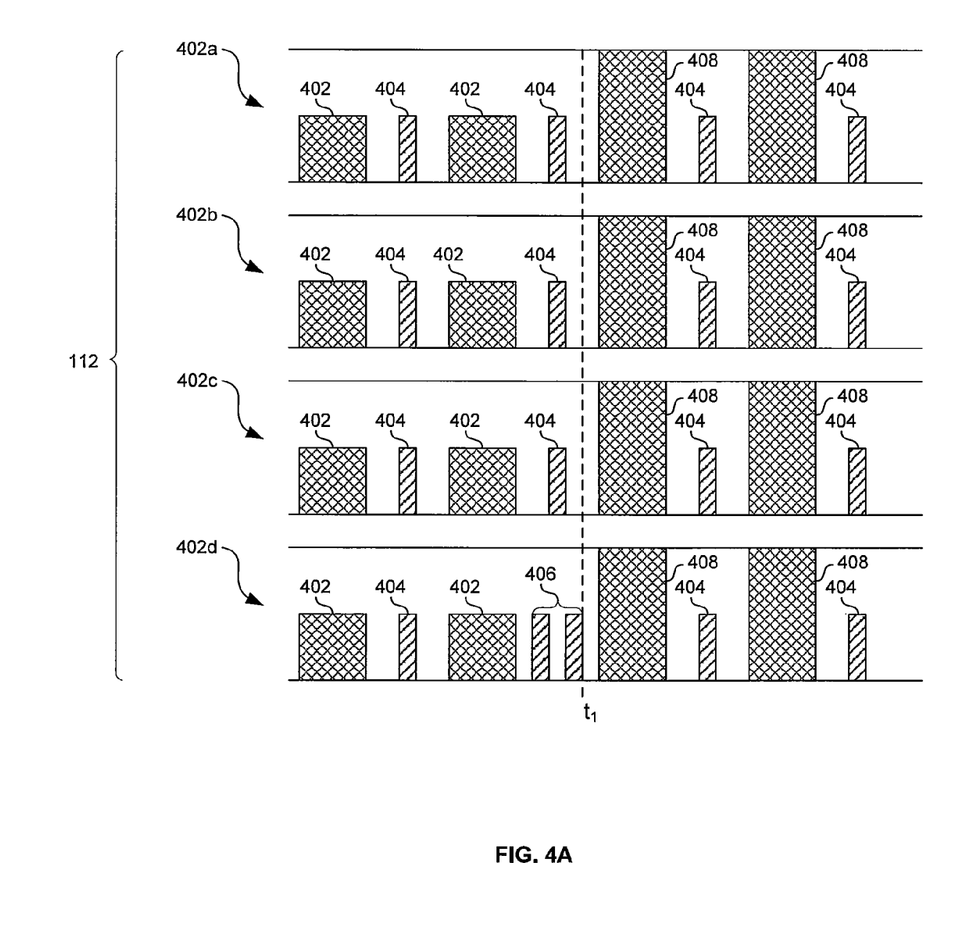
FIG. 4A is a diagram illustrating activity on four channels comprising an exemplary Ethernet link, in accordance with an embodiment of the invention.

FIG. 4A is a diagram illustrating activity on four channels comprising an exemplary Ethernet link, in accordance with an embodiment of the invention. Referring to FIG. 4A the link 112 may comprise four channels 402a, . . . , 402d.

The channels 402a, . . . , 402d may be similar to or the same as the channels 224a, . . . , 224d described with respect to FIG. 2.

In the exemplary operation depicted, prior to time $t_1$, the channels 402a, . . . , 402d may be transmitting data at less than the maximum data rate for each channel. In between blocks of data 402, which may represent packets, packets, etc., IDLE symbols 404 may be transmitted. However, prior to time $t_1$, it may be determined that a data rate of the link may need to be increased so as to, for example, accommodate a large multimedia stream which will soon reach the link. Accordingly, a distinct pattern 406 may be transmitted during an IPG on the channel 402d to coordinate an increase in the data rate. In this regard, the distinct pattern 406 may, for example, convey the new data rate and indicate when the data rate transition should occur. Subsequent to the distinct physical pattern 406, at time $t_1$, the channels 402a, . . . , 402d may transition to a higher data rate and transmit blocks of data 408.

Figure 4B:
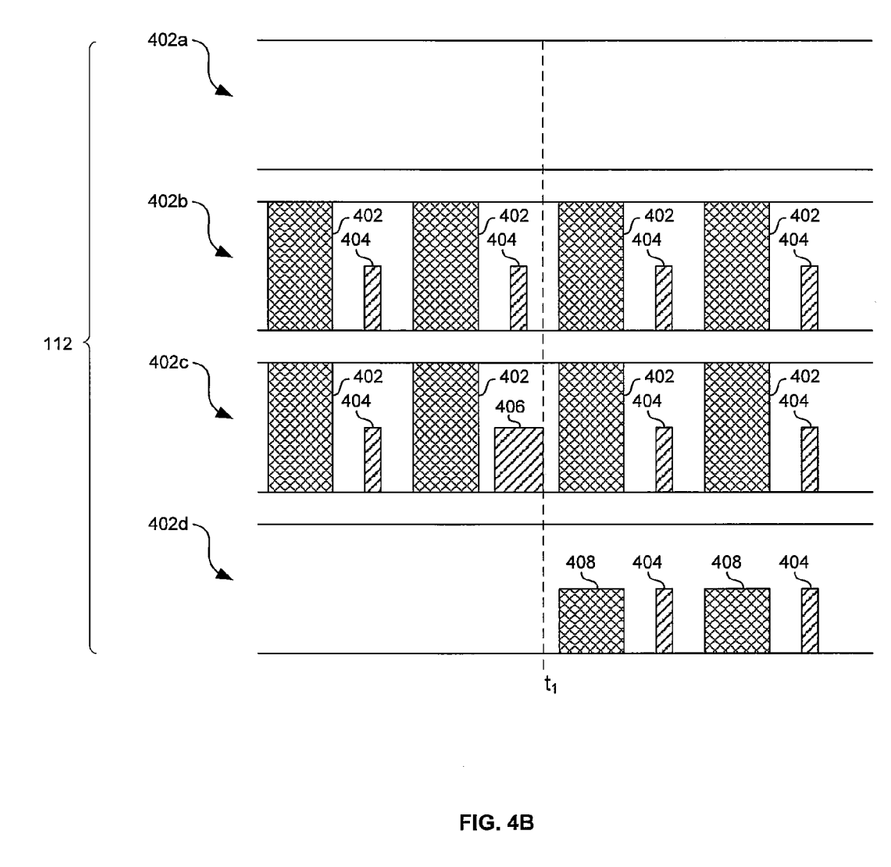
FIG. 4B is a diagram illustrating activity on four channels comprising an exemplary Ethernet link, in accordance with an embodiment of the invention.

FIG. 4B is a diagram illustrating activity on four channels comprising an exemplary Ethernet link, in accordance with an embodiment of the invention. Referring to FIG. 4B the link 112 may comprise four channels 402a, . . . , 402d.

The channels 402a, . . . , 402d may be similar to or the same as the channels 224a, . . . , 224d described with respect to FIG. 2.

In the exemplary operation depicted, prior to time $t_1$, the channels 402b and 402c may be active and transmitting data at the maximum data rate for each channel. In between blocks of data 402, which may represent packets, packets, etc., IDLE symbols 404 may be transmitted. However, prior to time $t_1$, it may be determined that a data rate of the link may need to increase to, for example, accommodate a large multimedia stream which will soon reach the link. Accordingly, a distinct pattern 406 may be transmitted during an IPG on the channel 402c to coordinate an increase in the data rate. In this regard, the distinct pattern 406 may, for example, convey the new data rate and indicate when the data rate transition should occur. Subsequent to the distinct physical pattern 406, at time $t_1$, the channels 402d may start-up and become active to begin communicating blocks of data 408 and IDLE symbols 404.

Figure 4C:
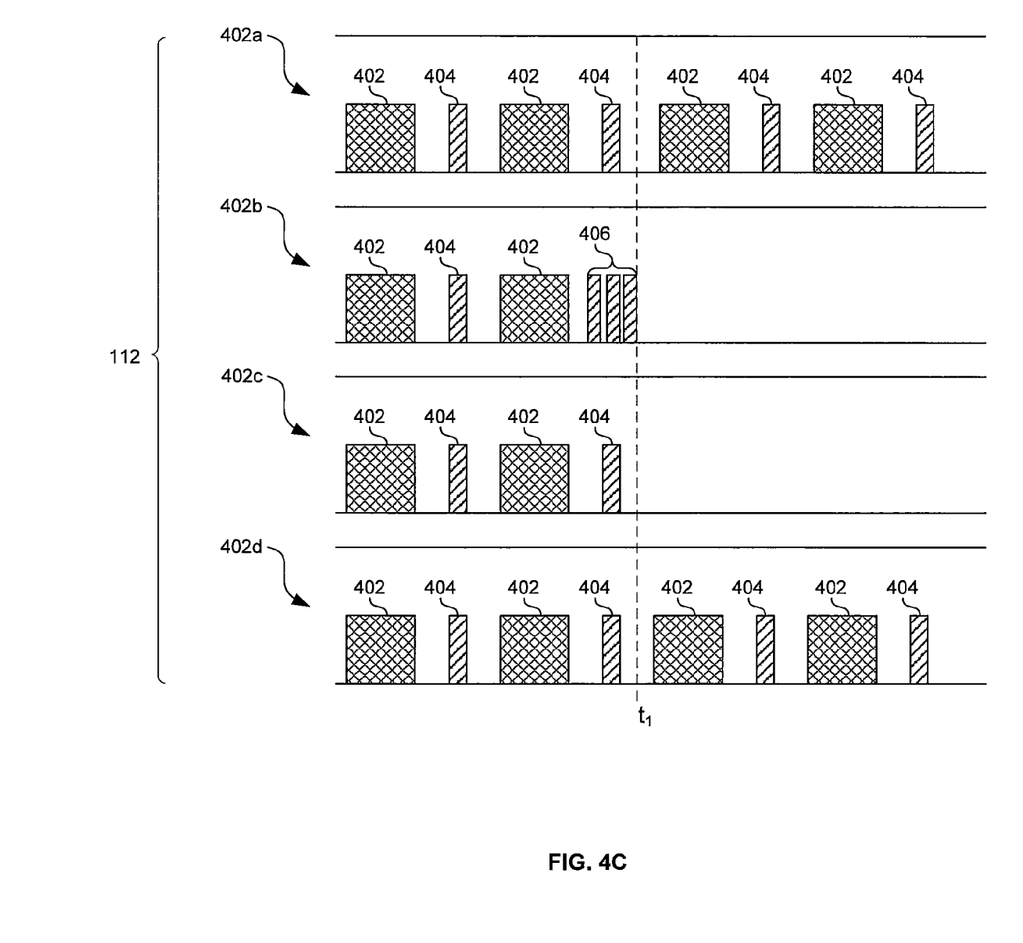
FIG. 4C is a diagram illustrating activity on four channels comprising an exemplary Ethernet link, in accordance with an embodiment of the invention.

FIG. 4C is a diagram illustrating activity on four channels comprising an exemplary Ethernet link, in accordance with an embodiment of the invention. Referring to FIG. 4C the link 112 may comprise four channels 402a, . . . , 402d.

The channels 402a, . . . , 402d may be similar to or the same as the channels 224a, . . . , 224d described with respect to FIG. 2.

In the exemplary operation depicted, prior to time $t_1$, the channels 402b and 402c may be active and transmitting data. In between blocks of data 402, which may represent packets and/or packets, IDLE symbols 404 may be transmitted. However, prior to time $t_1$, it may be determined that a data rate of the link may be decreased due, for example, to a multimedia stream coming to an end. Accordingly, a distinct pattern 406 may be transmitted during an IPG on the channel 402c to coordinate an decrease in the data rate. In this regard, the distinct pattern 406 may, for example, convey the new data rate and indicate when the data rate transition should occur. Subsequent to the distinct physical pattern 406, at time $t_1$, the channel 402b and 402c may be shut down and cease transmitting data.

Figure 5:
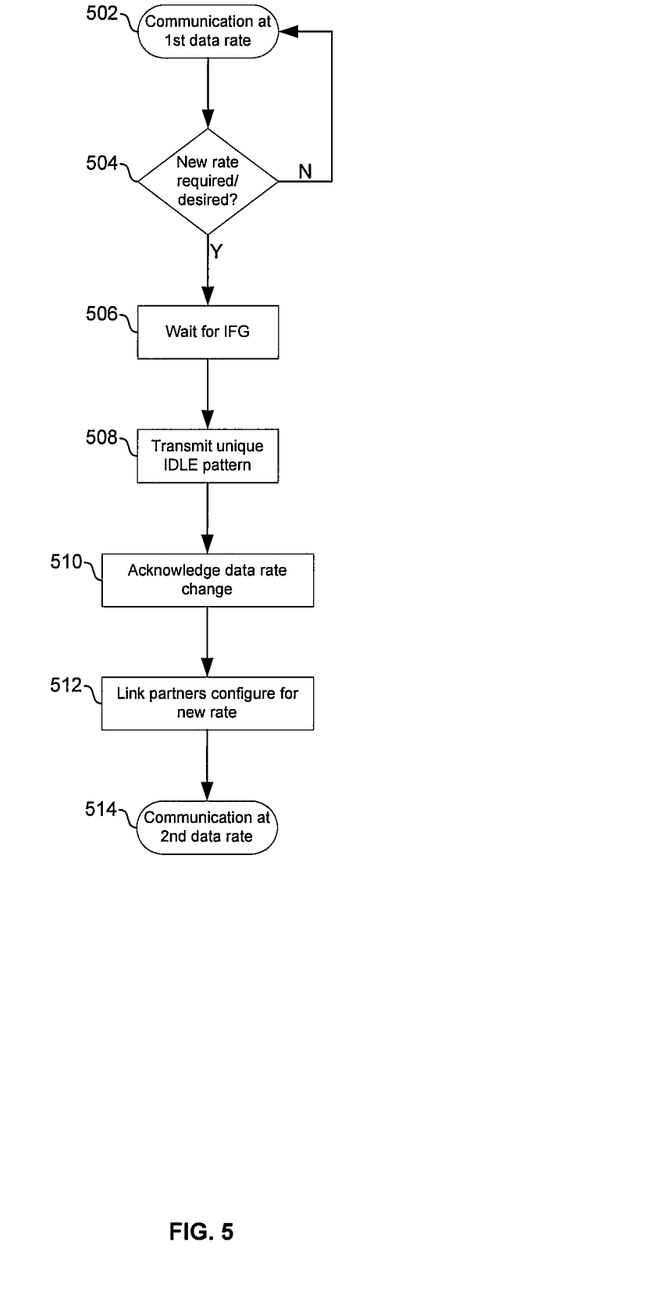
FIG. 5 is a flow chart illustrating exemplary steps for utilizing a distinct physical pattern on an active channel to indicate a data rate transition, in accordance with an embodiment of the invention.

FIG. 5 is a flow chart illustrating exemplary steps for utilizing a distinct physical pattern on an active channel to indicate a data rate transition, in accordance with an embodiment of the invention. Referring to FIG. 5, the exemplary steps may begin with step 502 when a pair of nodes may be communicating over a network link at a first data rate. Subsequent to step 502, the exemplary steps may advance to step 504. In step 504, a first of the nodes may determine whether a new data rate is required and/or desirable on the network link. In instances that the current data rate is acceptable, the exemplary steps may return to step 502.

Returning to step 504, in instances that a new data rate is desirable and/or required on the network link, the exemplary steps may advance to step 506. In step 506, the first node may wait for an IPG and when the IFG arrives, the exemplary steps may advance to step 508. In step 508, the first node may transmit a distinct physical patter to indicate its desire and/or need to transition to a 2nd data rate. Subsequent to step 508, the exemplary steps may advance to step 510. In step 510, the second node may acknowledge the data rate change by transmitting a distinct physical pattern. Subsequent to step 510, the exemplary steps may advance to step 512. In step 512, the nodes may be configured to communicate at the 2nd data rate. Subsequent to step 512, the exemplary steps may advance to step 514. In step 514, the nodes may begin exchanging data over the network link at the $2^{nd}$ data rate.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for distinct physical pattern on an active channel to indicate a data rate transition for energy efficient Ethernet.

Exemplary aspects of a method and system for a distinct physical pattern 406 on an active channel 402 to indicate a data rate transition for energy efficient Ethernet. In this regard, one or more distinct physical patterns 406 may be transmitted on one or more active channels 402 of a network link 112 during an IPG to control a data rate on the network link 112. The unique physical pattern 406 may be transmitted instead of or in addition to one or more IDLE symbols 404. The distinct physical pattern 406 may communicate a data rate to be utilized on the network link 112 and/or indicate when a data rate transition is to occur on the network link 112. The distinct physical pattern 406 may be transmitted, and/or the data rate transition may occur, during a specified IPG or during a specified packet boundary, such as a specific bit of the packet. The data rate may be controlled, and the distinct physical pattern 406 may be determined, based on power consumption on the link 1102 and/or power consumption of one or more nodes 200 communicatively coupled to the link. In various embodiments of the invention, the distinct physical pattern 406 may comprise one or more control characters. In various embodiments of the invention, the distinct physical patter comprises an ordered set of voltage levels, symbols, and/or characters.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
transmitting, by a first physical layer device in a first network node, one or more IDLE symbols during a first inter-packet gap on one or more active channels of a network link between said first physical layer device and a second physical layer device in a second network node; and
transmitting, by said first physical layer device, one or more distinct physical patterns during a second inter-packet gap on said one or more active channels of said network link between said first physical layer device and said second physical layer device in said second network node, said one or more distinct physical patterns comprising an ordered set of a plurality of voltage levels in a predetermined order, said transmission of said one or more distinct physical patterns configured to control a transition from a first rate of data transmission by said first physical layer device on said network link to a second rate of data transmission by said first physical layer device on said network link, the second rate of data transmission determined using the ordered set of the plurality of voltage levels in the predetermined order.

2. The method according to claim 1, wherein said first physical layer device transmits said one or more distinct physical patterns instead of one or more IDLE symbols.

3. The method according to claim 1, wherein said first physical layer device transmits said one or more distinct physical patterns in addition to one or more IDLE symbols.

4. The method according to claim 1, wherein said first physical layer device indicates, via said one or more distinct physical patterns, one or more data rate management techniques to utilize for implementing said second rate of data transmission.

5. The method according to claim 1, wherein said second rate of data transmission is determined based on at least one of past traffic on said network link or expected traffic on said network link.

6. The method according to claim 1, wherein said first physical layer device indicates, via said one or more distinct physical patterns, when said transition should occur.

7. The method according to claim 6, wherein said transition occurs during a specified inter-packet gap or during a specified packet boundary.

8. The method according to claim 1, wherein said first physical layer device controls said rate of data transmission by said first physical layer device based on a power consumption on said network link.

9. The method according to claim 1, wherein said first physical layer device controls said rate of data transmission on said network link based on a power consumption of one or both of said first network node or said second network node.

10. A system for networking, the system comprising:
one or more circuits of a first physical layer device in a first network node operable to:
transmit, during a first inter-packet gap, one or more IDLE symbols on one or more active channels of a network link between said first physical layer device and a second physical layer device in a second network node; and
transmit, during a second inter-packet gap, one or more distinct physical patterns on said one or more active channels of said network link between said first physical layer device and said second physical layer device in said second network node, said one or more distinct physical patterns comprising an ordered set of a plurality of voltage levels in a predetermined order, said transmission of said one or more distinct physical patterns configured to control a transition from a first rate of data transmission by said first physical layer device on said network link to a second rate of data transmission by said first physical layer device on said network link, the second rate of data transmission determined using the ordered set of the plurality of voltage levels in the predetermined order.

11. The system according to claim 10, wherein said one or more circuits are operable to transmit said one or more distinct physical patterns instead of one or more IDLE symbols.

12. The system according to claim 10, wherein said one or more circuits are operable to transmit said one or more distinct physical patterns in addition to one or more IDLE symbols.

13. The system according to claim 10, wherein said one or more circuits are operable to indicate, via said one or more distinct physical patterns, one or more data rate management techniques to utilize for implementing said second rate of data transmission.

14. The system according to claim 10, wherein said second rate of data transmission is determined based on at least one of past traffic on said network link or expected traffic on said network link.

15. The system according to claim 10, wherein said one or more circuits are operable to indicate, via said one or more distinct physical patterns, when said transition should occur.

16. The system according to claim 15, wherein said transition occurs during a specified inter-packet gap or during a specified packet boundary.

17. The system according to claim 10, wherein said rate of data transmission by said first physical layer device is controlled based on a power consumption on the link.

18. The system according to claim 10, wherein said rate of data transmission by said first physical layer device on said network link is controlled based on a power consumption of one or both of said first network node or said second network node.

* * * * *